United States Patent
Pan et al.

(10) Patent No.: US 7,485,024 B2
(45) Date of Patent: Feb. 3, 2009

(54) FABRICATING METHOD OF FIELD EMISSION TRIODES

(75) Inventors: Fu-Ming Pan, Jhudong Township, Hsinchu County (TW); Po-Lin Chen, Taipei (TW); Chen-Chun Lin, Hsinchu (TW); Mei Liu, Neipu Township, Pingtung County (TW); Chi-Neng Mo, Jhongli (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 197 days.

(21) Appl. No.: 11/249,954

(22) Filed: Oct. 12, 2005

(65) Prior Publication Data

US 2007/0243787 A1    Oct. 18, 2007

(51) Int. Cl.
*H01J 9/00* (2006.01)
*H01J 9/24* (2006.01)

(52) U.S. Cl. .............. 445/24; 445/25; 205/175; 205/324; 257/E21.291

(58) Field of Classification Search ............ 445/24, 445/25, 50–52; 205/171, 175, 323, 324; 257/E21.291
See application file for complete search history.

(56) References Cited

U.S. PATENT DOCUMENTS

| 3,724,066 | A * | 4/1973 | Wainer et al. ............... 29/592.1 |
| 6,129,901 | A * | 10/2000 | Moskovits et al. ......... 423/447.3 |
| 6,217,403 | B1 * | 4/2001 | Chakravorty et al. ........... 445/24 |
| 6,538,367 | B1 * | 3/2003 | Choi et al. .................. 313/309 |
| 6,624,589 | B2 * | 9/2003 | Kitamura et al. .......... 315/169.3 |
| 6,628,053 | B1 * | 9/2003 | Den et al. .................... 313/310 |
| 6,650,061 | B1 * | 11/2003 | Urayama et al. .......... 315/169.3 |
| 6,794,666 | B2 * | 9/2004 | Choi et al. ............. 250/492.24 |
| 6,855,025 | B2 * | 2/2005 | Iwasaki et al. ................ 445/24 |
| 6,975,075 | B2 * | 12/2005 | Sagawa et al. ............ 315/169.1 |
| 6,979,244 | B2 * | 12/2005 | Den et al. ...................... 445/24 |
| 7,115,306 | B2 * | 10/2006 | Jeong et al. .................. 427/577 |
| 2002/0182542 | A1 * | 12/2002 | Choi et al. ................... 430/296 |
| 2005/0285502 | A1 * | 12/2005 | Lee et al. ..................... 313/495 |
| 2006/0046602 | A1 * | 3/2006 | Kang .......................... 445/50 |
| 2006/0071598 | A1 * | 4/2006 | Eden et al. .................. 313/631 |

FOREIGN PATENT DOCUMENTS

KR    2003-0032727    4/2003
TW        428189      4/2001

OTHER PUBLICATIONS

"Anodic Aluminum Oxide as a Template for Carbon Nanotube Field Emitters" By Chen-Chun Lin et al. / 2005 MRS San Francisco Program & Exhibit Guide.

* cited by examiner

*Primary Examiner*—Mariceli Santiago
*Assistant Examiner*—Jose M Diaz
(74) *Attorney, Agent, or Firm*—J.C. Patents

(57) ABSTRACT

A fabricating method of field emission triodes is provided. First, a cathode conductive layer, an insulator layer, and a gate layer are formed on a substrate. An opening is formed in the insulator layer and the gate layer to expose a portion of the cathode conductive layer. A metal layer is formed on the cathode conductive layer. A first anodization is performed so as to form a first metal anodization layer from a portion of the metal layer. After the first metal anodization layer is removed, a second metal anodization layer having a plurality of pores is formed. Thereafter, a catalyst layer is formed in the pores. Then, a plurality of carbon nanotubes are formed in the pores.

16 Claims, 4 Drawing Sheets

FABRICATING METHOD OF FIELD EMISSION TRIODES

BACKGROUND OF THE INVENTION

1. Field of Invention

The present invention is relating to a fabricating method of field emission triodes. In particularly, the present invention is relating to a fabricating method of field emission triodes having carbon nanotubes.

2. Description of Related Art

Field emission displays (FED) have became more and more valued because of having superior brightness, wide viewing angle, transient response swiftness, and other advantages. In addition, carbon nanotubes have a property of lower initiating electric field so that the carbon nanotubes are the preferred cathode emitter material for the field emission display.

In the conventional manufacturing technology of carbon nanotube field emission device, chemical vapor deposition is usually used to directly grow the carbon nanotubes at the cathode region coated by a metal catalyst. However, the carbon nanotubes formed using this method exhibit nonuniform distribution. Under the typical field emission operating conditions, the number of carbon nanotubes in the same parallel orientation direction is relatively low, and thus the threshold voltage and emission current density are not meet the requirements. Furthermore, the tube density distribution of the carbon nanotubes is not easy to control if the carbon nanotubes are grown using this method. It leads to uneven current density distribution and phosphor emitting brightness. Furthermore, under high electric field operation, adhesion between the carbon nanotubes and the substrate is yet to be tested.

Taiwan Patent 428189 discloses a fabrication method for a cathode array using carbon nanotubes. However, in the prior art, the formed aluminum anodization film has poor pore diameter uniformity, distributive uniformity, and vertical alignment. As a result, the pipe diameter uniformity, distributive uniformity, and vertical alignment of the carbon nanotubes formed inside the pores are deteriorated, and thus the field emission characteristic of the carbon nanotubes is also poor. Furthermore, Taiwan Patent 428189 uses aluminum or aluminum alloy as cathode lines. However, aluminum has a lower melting point, and thus the subsequent processing temperature should be lower than 450° C. Hence, only lower temperature chemical vapor deposition can be used to grow carbon nanotubes. Furthermore, using aluminum or aluminum alloy as cathode lines has disadvantages of that when the carbon nanotube field emission device is operated under high current conditions, electromigration may be easily produces at the cathode lines which leads to open circuit.

SUMMARY OF THE INVENTION

An objective for the present invention is for providing a fabrication method of field emission triodes capable of improving pipe diameter uniformity, distributive uniformity, and vertical alignment of carbon nanotubes so as to improve field emission characteristics of the carbon nanotubes.

Another objective for the present invention is for providing a fabricating method for the field emission triodes that can adopt higher processing temperature for improving manufacturing process flexibility.

To achieve the aforementioned objectives, the present invention proposes a fabricating method for the field emission triodes. First, a cathode conductive layer, an insulator layer, and a gate layer are sequentially formed on a substrate. An opening is formed in the gate layer and the insulator layer to expose a portion of the cathode conductive layer. A metal layer is formed over the cathode conductive layer. Next, a first anodization is conducted to the metal layer so as to form a first metal anodization layer from a portion of the metal layer. Thereafter, the first metal anodization layer is removed to expose the un-anodized metal layer. Later, a second anodization is conducted to the un-anodized metal layer to form a second metal anodization layer, wherein a plurality of pores are formed in the second metal anodization layer. A catalyst layer is formed inside the pores, and then a plurality of carbon nanotubes are formed inside the pores.

According to an embodiment of the present invention, the material for the cathode conductive layer is, for example, a metal, an alloy, a metal oxide, or a doped semiconductor. The preferred material is, for example, titanium, titanium nitride, tantalum, or tantalum nitride.

According to an embodiment of the present invention, the material for the insulator layer is, for example, silicon dioxide or silicon nitride.

According to an embodiment of the present invention, the material for the gate layer is, for example, a metal, an alloy or a doped semiconductor.

According to an embodiment of the present invention, the material for the metal layer is, for example, aluminum or aluminum alloy.

According to an embodiment of the present invention, the first metal anodization layer is, for example, an anodic aluminum oxide layer.

According to an embodiment of the present invention, the method for removing the first metal anodization layer is, for example, a wet etching process.

According to an embodiment of the present invention, a barrier layer is further formed on the bottom of the pores. In addition, the method further includes the removal procedure for this barrier layer before the carbon nanotubes are formed inside the pores.

According to an embodiment of the present invention, the method for forming the catalyst layer is, for example, an electrochemical method.

According to an embodiment of the present invention, the second metal anodization layer is, for example, an anodic aluminum oxide layer.

According to an embodiment of the present invention, the method for forming carbon nanotubes is, for example, chemical vapor deposition (CVD). The chemical vapor deposition is, for example, electron cyclotron resonance-CVD, microwave plasma chemical vapor deposition, plasma enhanced chemical vapor deposition, or hot filament chemical vapor deposition. The reaction gas used in the chemical vapor deposition includes, for example, a carbonaceous gas. The carbonaceous gas is, for example, carbon monoxide, methane, ethane, propane, acetylene, benzene ($C_6H_6$), or combinations thereof.

In the fabricating method of the field emission triodes of the present invention, because double anodization step is utilized, pipe diameter uniformity, distributive uniformity, and vertical alignment of the carbon nanotubes of the field emission triodes can be improved, and thus field emission characteristics of the carbon nanotubes can be improved.

For the fabricating method of the field emission triodes described in an embodiment of the present invention, the material for the cathode conductive layer, for example, includes titanium, titanium nitride, tantalum, or tantalum nitride, so that the fabricating method can tolerate higher processing temperatures.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further under-standing of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
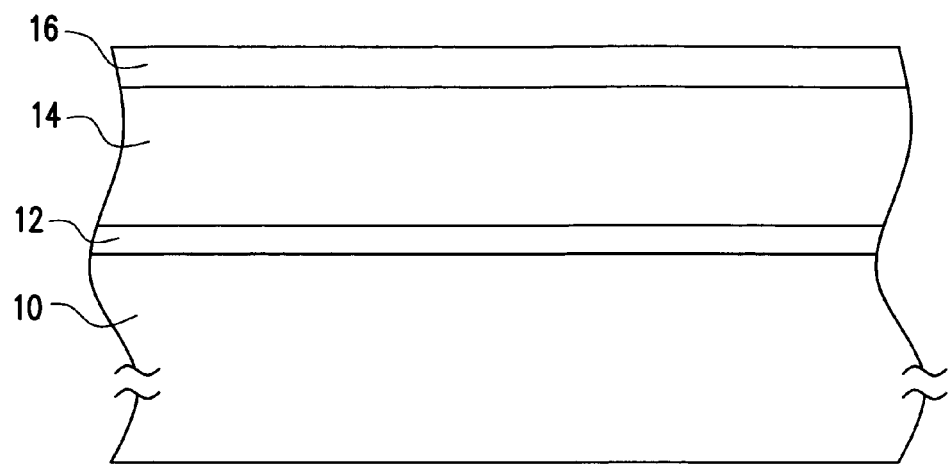
FIG. 1A to FIG. 1H are cross-sectional views showing a fabricating process for field emission triodes according to an embodiment of the present invention.

FIG. 1A to FIG. 1H are cross-sectional views showing a fabricating process for field emission triodes according to an embodiment of the present invention. Referring to FIG. 1A, a cathode conductive layer 12, an insulator layer 14, and a gate layer 16 are sequentially formed over a substrate 10. The substrate 10 is, for example, a silicon substrate or a glass substrate. The cathode conductive layer 12 is made of cold cathode conductive material for the field emission triodes. The cathode conductive layer 12 is, for example, a single-layered or double-layered structure, and has a material of metal, alloy, metal oxide, doped semiconductor, or other suitable materials. The cathode conductive layer 12 can also provide superior adhesion between the substrate 10 and the insulator layer 14. The cathode conductive layer 12 has a thickness from 0.05 μm to 0.5 μm. In a preferred embodiment, the material for the cathode conductive layer 12 is, for example, titanium, titanium nitride, tantalum or tantalum nitride. Because the aforementioned materials have a ability to tolerate manufacturing process temperature exceeding 800° C., higher temperature chemical vapor deposition processes, such as electron cyclotron resonance-CVD can be used in the subsequent processes for forming carbon nanotubes. This can provide better manufacturing process flexibility.

The material for the insulator layer 14 is, for example, silicon dioxide ($SiO_2$) or silicon nitride ($Si_3N_4$). The insulator layer 14 has a thickness between about 0.5 μm to 3 μm. The material for the gate layer 16 comprises a metal, an alloy, or a doped semiconductor material having good conductivity. The gate layer 16 has a thickness about from 0.05 μm to 0.5 μm. It should be noted that in the fabricating method for the present invention, the cathode conductive layer 12 is, for example, formed from a plurality of stripes of parallel cathode lines. The gate layer 16, for example, is formed from a plurality of parallel gate lines. And the extended directions for the cathode lines and the gate lines are slightly perpendicularly intersect. In addition, the intersecting region formed by a cathode line and a gate line is a pixel unit. FIG. 1A to FIG. 1H provides illustrations for one intersecting region.

Figure 1B:
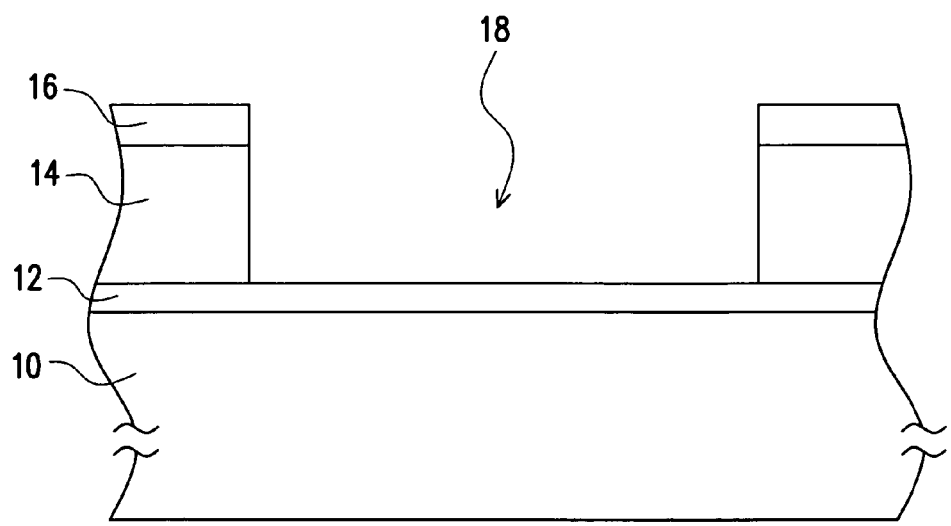

Referring to FIG. 1B, an opening 18 is formed in the gate layer 16 and the insulator layer 14 to expose a portion of the cathode conductive layer 12. The forming method for the opening 18, for example, is using photolithography and etching processes. The opening 18, for example, is round, oval, or square. The preferred shape is round. The opening 18 has a diameter about from 0.5 μm to 20 μm.

Figure 1C:
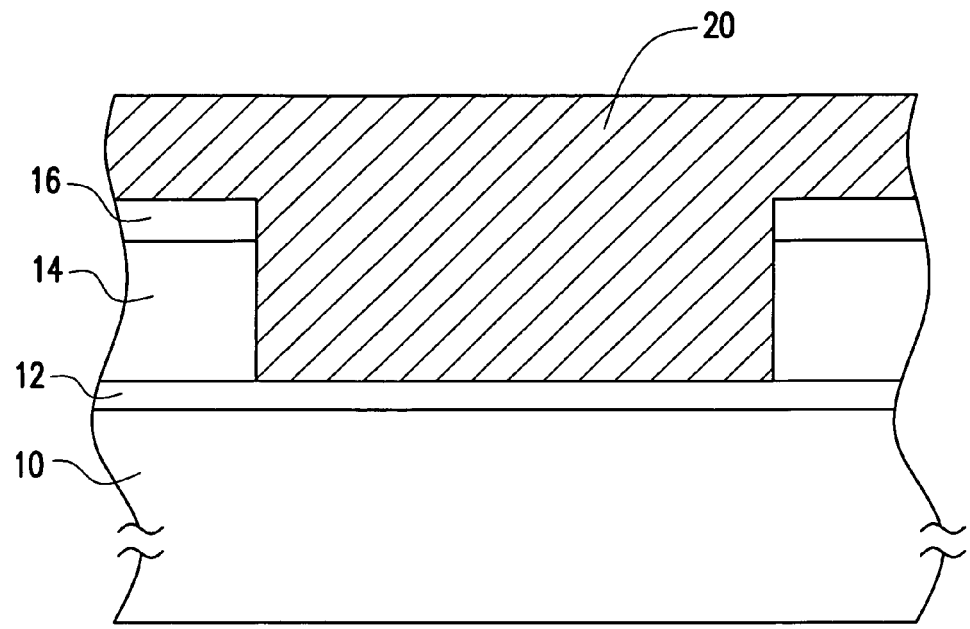

Referring to FIG. 1C, I a metal layer 20 is formed over the cathode conductive layer 12. The manufacturing method for forming the metal layer 20 is, for example, physical vapor deposition. The material for the metal layer 20 is, for example, aluminum or aluminum alloy. The deposition temperature of the metal layer 20, for example, is between room temperature and 400° C. The metal layer 20 has a thickness between 2 μm and 6 μm.

Figure 1D:
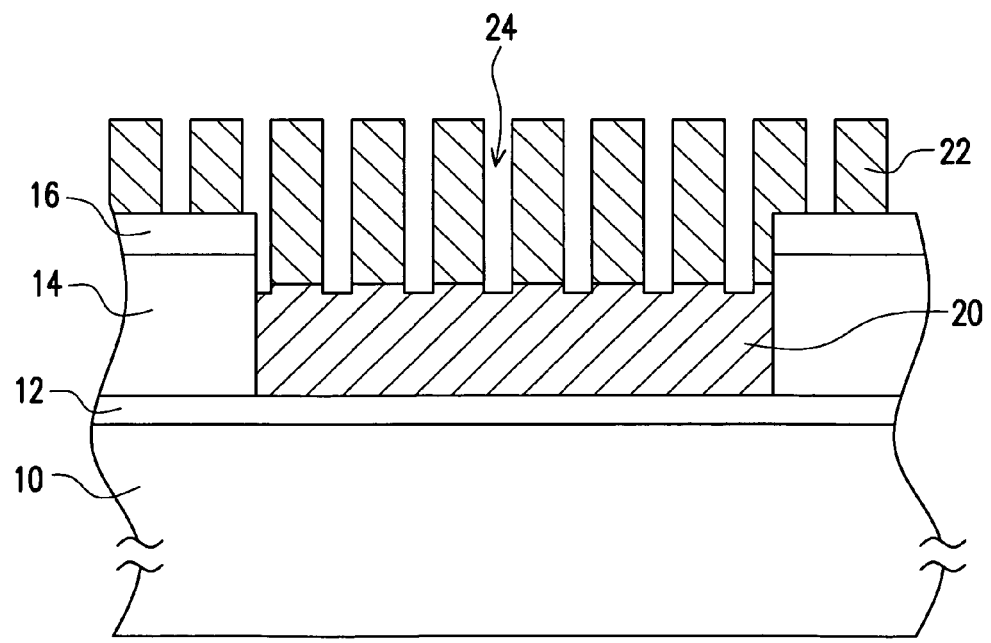

Referring to FIG. 1D, a first anodization is conducted to the metal layer 20. The first anodization procedure is as follows: First, the substrate 10 is placed into an electrolytic fluid. The electrolytic fluid, for example, is oxalic acid, sulfuric acid, phosphoric acid, or mixtures thereof. The electrolytic fluid temperature, for example, is between 0° C. and 25° C. Thereafter, an appropriate voltage is applied on the metal layer 20 to conduct an anodic oxidation reaction. The appropriate voltage, for example, is between 8 volts and 100 volts. The aforementioned anodic oxidation reaction time, for example, is from 5 minutes to 40 minutes so that a first metal anodization layer 22 is formed from a portion of the metal layer 20. In an embodiment, if the material for the metal layer 20 is aluminum, an anodic aluminum oxide (AAO) having a plurality of pores 24 therein is formed after the anodization. That is, the first metal anodization layer 22, for example, is a porous anodic aluminum oxide layer. Typically the formed pores 24 made during the first anodization exhibits disorderly arrangements.

Figure 1E:
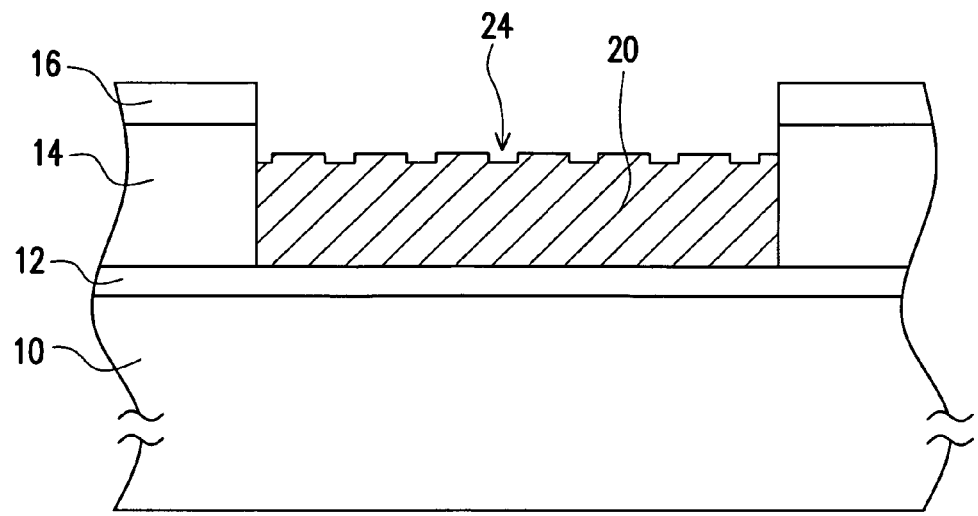

Thereafter, the first metal anodization layer 22 is removed to expose the metal layer 20 that is un-anodized as shown in FIG. 1E. The removing procedure, for example, is a wet etching process. The etchant for the wet etching process can be acid or base. The preferred etching conditions, for example, is using a mixture including 6 wt % phosphoric acid and 1.5 wt % chromic acid and performed at temperature of 60° C. After removing the first metal anodization layer 22, the pattern of the pores 24 formed during the first anodization may be still remained on the surface of the metal layer 20.

Figure 1F:
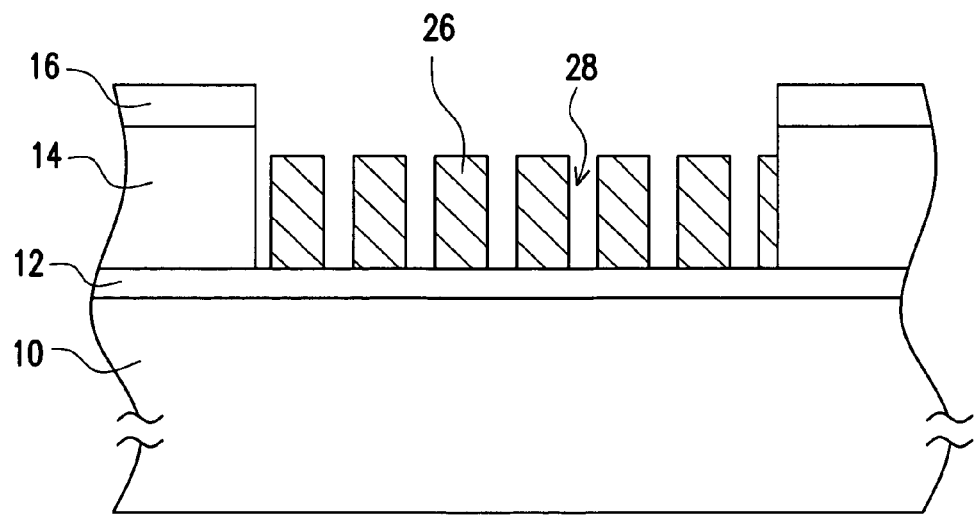

Referring to FIG. 1F, a second anodization is carried out to the un-anodized metal layer 20 to form a second metal anodization layer 26. The process conditions of the second anodization can be the same or similar to that of the first anodization. Similarly, if the material for the metal layer 20 is using aluminum, the formed second metal anodization layer 26 is also a porous anode aluminum oxide layer. The depth of pores 28 formed in the second metal anodization layer 26 can be controlled by controlling the anodization time. In comparison to the conventional technology using single anodization step, the pores 28 formed by double anodization step in the present invention exhibit better pore diameter uniformity, distributive uniformity, and vertical alignment.

It should be noted that on the bottom of the pores 28 in the second metal anodization layer 26, a barrier layer may be formed. Therefore, for the sake of having successful sequential process execution, it is best to remove the barrier layer. For example, at the end point of the aforementioned second anodization, reduce the voltage gradually to 5 to 10 volts. For example, lower the voltage by 0.1 volts for each second. In this way, the barrier layer thickness can be lowered. Afterwards, the substrate 10 is placed inside an etchant to remove the barrier layer. The etchant can be acid or base. The preferred etching condition, for example, uses 5 wt % phosphoric acid as the etchant and etching for one hour at room temperature. As a result, the barrier layer can be removed.

Figure 1G:
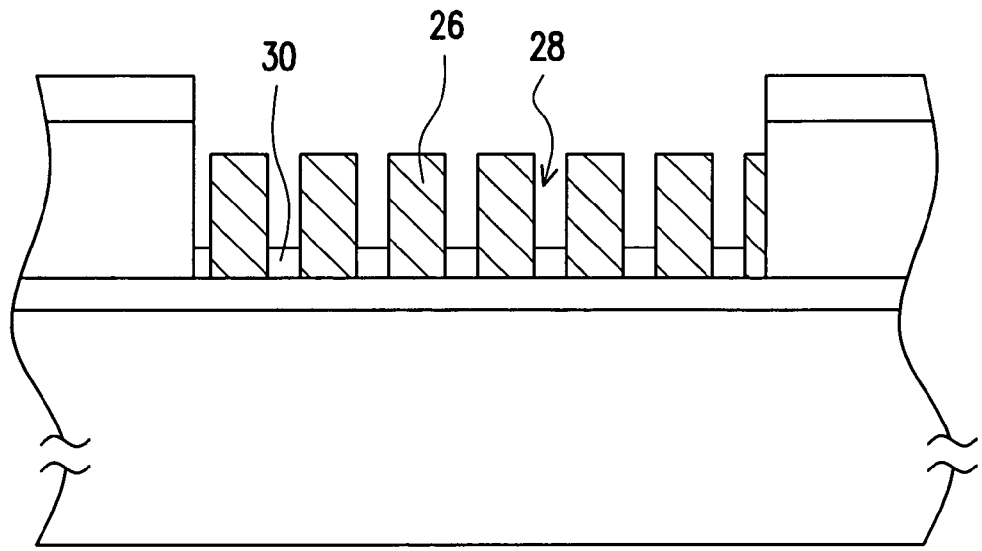

Referring to FIG. 1G, later, a catalyst layer 30 is formed inside the pores 28 in the second metal anodization layer 26. The catalyst layer 30 is formed, for example, by electroplating, electroless-plating, and other electrochemical methods to form the catalyst layer 30 at the bottom of the pores 28. The material for the catalyst layer 30, for example, is iron (Fe), cobalt (Co), nickel (Ni), other metals, alloys, or combinations thereof. The preferred method for forming the catalyst layer 30 is electroplating. The preferred processing conditions for electroplating comprises using 5 wt % cobalt sulphate/2 wt % boric acid aqueous solution as electrolyte and the alternating voltage is between 11 volts and 13 volts, and is conducted in room temperature for about 1 minute.

Figure 1H:
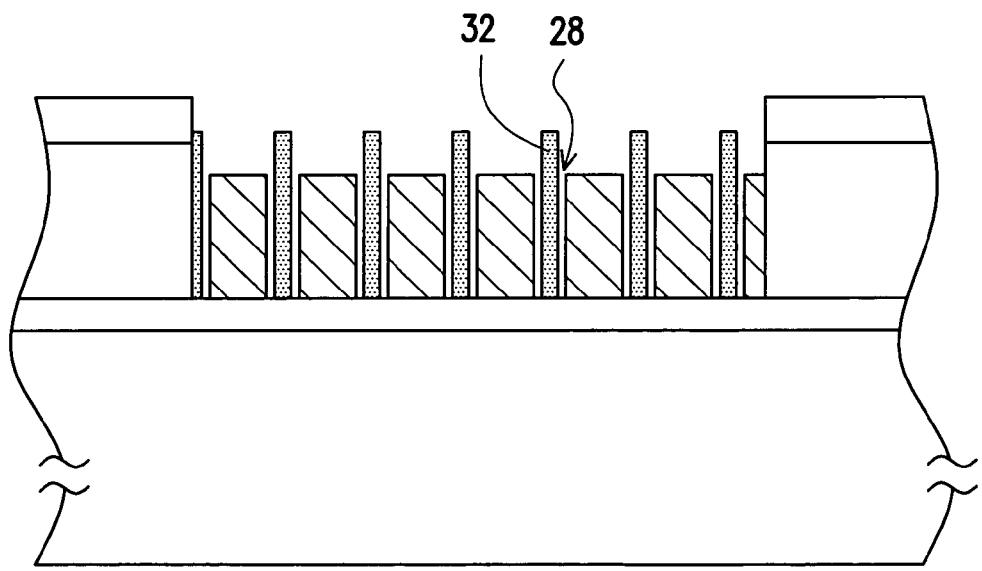

Referring to FIG. 1H, a plurality of carbon nanotubes 32 are formed inside the pores 28 in the second metal anodization layer 26. The carbon nanotubes 32 are formed by, for example, chemical vapor deposition. Because the material of the cathode conductive layer 12, for example, includes titanium, titanium nitride, tantalum, or tantalum nitride, it can tolerate processing temperatures above 800° C. Therefore, at this time, chemical vapor deposition performed in higher temperature can be used to form the carbon nanotubes 32. This chemical vapor deposition, for example, is electron cyclotron resonance-CVD, microwave plasma chemical vapor deposition, plasma enhanced chemical vapor deposition, or hot filament chemical vapor deposition. In an embodiment, the reaction gas used in the chemical vapor deposition includes at least one carbonaceous gas. The carbonaceous gas, for example, is carbon monoxide, methane, ethane, propane, acetylene, benzene ($C_6H_6$), or combinations thereof. In addition, a reduction gas or a carrier gas such as hydrogen, ammonia, argon gas, nitrogen gas or mixtures thereof can also be flowed into the CVD chamber. Preferably, the method for forming carbon nanotubes 32 is using electron cyclotron resonance chemical vapor deposition (ECR-CVD). The preferred processing conditions for the electron cyclotron resonance chemical vapor deposition, for example, are as follows: magnetic field is at 875 Gauss, microwave capacity factor is at 600 watts, working pressure is at 0.25 Pa, the temperature of the substrate 10 is at 400° C. to 600° C., using methane (CH4)/hydrogen (H2) gas mixture as the reaction mixture, and total gas flow rate is at 22 sccm. During the fabrication process for the carbon nanotubes 32, it is preferred to be able to control the growth duration for the carbon nanotubes 32 to permit their height to be protruding the pores 28 of the second metal anodization layer 26 but lower than the surface of the gate layer 16. As a result, because the pores 28 in the second metal anodization layer 26 have improved pore diameter uniformity, distributive uniformity, and vertical alignment, the carbon nanotubes 32 formed inside the pores 28 also have improved pipe diameter uniformity, distributive uniformity, and vertical alignment comparing with the conventional technology.

Based on the aforementioned, the fabrication method of the field emission triodes of the present invention includes at least the following characteristics and advantages:

Because the double anodization step is performed in the present invention, the pores formed in the metal anodization layer have better pore diameter uniformity, distributive uniformity, and vertical alignment in comparison to the conventional method. Therefore, the carbon nanotubes formed inside the pores also have excellent pipe diameter uniformity, distributive uniformity, and vertical alignment so as to improve the field emission characteristic of the field emission triodes.

Because the material for the cathode conductive layer, such as titanium, titanium nitride, tantalum, or tantalum nitride, can tolerate processing temperatures of above 800° C., a higher temperature chemical vapor deposition, such as electron cyclotron resonance-CVD, can be used for forming carbon nanotubes so as to increase processing flexibility.

The implementation method for the present invention is using double anodization step to form a porous anodic aluminum oxide layer as an example, but the present invention is not limited to this. The present invention can also adopt more than two anodization treatments for forming pores having the preferred pore diameter uniformity, distributive uniformity, and vertical alignment, to permit the carbon nanotubes inside the pores to have better pipe diameter uniformity, distributive uniformity, and vertical alignment.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A fabricating method for field emission triodes, comprising:
    forming a cathode conductive layer, an insulator layer, and a gate layer on a substrate sequentially;
    forming an opening in the gate layer and the insulator layer to expose a portion of the cathode conductive layer;
    forming a metal layer on the exposed portion of the cathode conductive layer in the opening;
    conducting a first anodization to the metal layer so as to form a first metal anodization layer from a portion of the metal layer;
    removing the first metal anodization layer for exposing the un-anodized metal layer;
    conducting a second anodization to the un-anodized metal layer to form a second metal anodization layer, wherein a plurality of through pores are formed in the second metal anodization layer in the opening;
    forming a catalyst layer in the through pores; and
    forming a plurality of carbon nanotubes inside the through pores, wherein each of the carbon nanotubes grows from the cathode conductive layer in each of the through pores.

2. The fabricating method for field emission triodes of claim 1, wherein the material for the cathode conductive layer comprises a metal, an alloy, a metal oxide, or a doped semiconductor.

3. The fabricating method for field emission triodes of claim 1, wherein the material for the cathode conductive layer comprises titanium, titanium nitride, tantalum, or tantalum nitride.

4. The fabricating method for field emission triodes of claim 1, wherein the material for the insulator layer comprises silicon dioxide or silicon nitride.

5. The fabricating method for field emission triodes of claim 1, wherein material for the gate layer comprises a metal, an alloy, or a doped semiconductor.

6. The fabricating method for field emission triodes of claim 1, wherein the material for the metal layer comprises aluminum or aluminum alloy.

7. The fabricating method for field emission triodes of claim 1, wherein the first metal anodization layer comprises an anodic aluminum oxide layer.

8. The fabricating method for field emission triodes of claim 1, wherein the method for removing the first metal anodization layer comprises a wet etching process.

9. The fabricating method for field emission triodes of claim 1, wherein the second metal anodization layer comprises an anodic aluminum oxide layer.

10. The fabricating method for field emission triodes of claim 1, further comprising forming a barrier layer at the bottom portions of the pores.

11. The fabricating method for field emission triodes of claim 10, further comprising removing the barrier layer before the carbon nanotubes are formed inside the pores.

12. The fabricating method for field emission triodes of claim 1, wherein the method for forming of the catalyst layer comprises an electrochemical method.

13. The fabricating method for field emission triodes of claim 1, wherein the method for forming the carbon nanotubes comprises chemical vapor deposition (CVD).

14. The fabricating method for field emission triodes of claim 13, wherein the chemical vapor deposition comprises electron cyclotron resonance-CVD, microwave plasma chemical vapor deposition, plasma enhanced chemical vapor deposition, or hot filament chemical vapor deposition.

15. The fabricating method for field emission triodes of claim 13, wherein the reaction gas used in the chemical vapor deposition comprises at least a carbonaceous gas.

16. The fabricating method for a field emission triodes of claim 15, wherein the carbonaceous gas is selected from the group consisting of carbon monoxide, methane, ethane, propane, acetylene, benzene (C6H6) and a combination thereof.

* * * * *